Patented Oct. 12, 1937

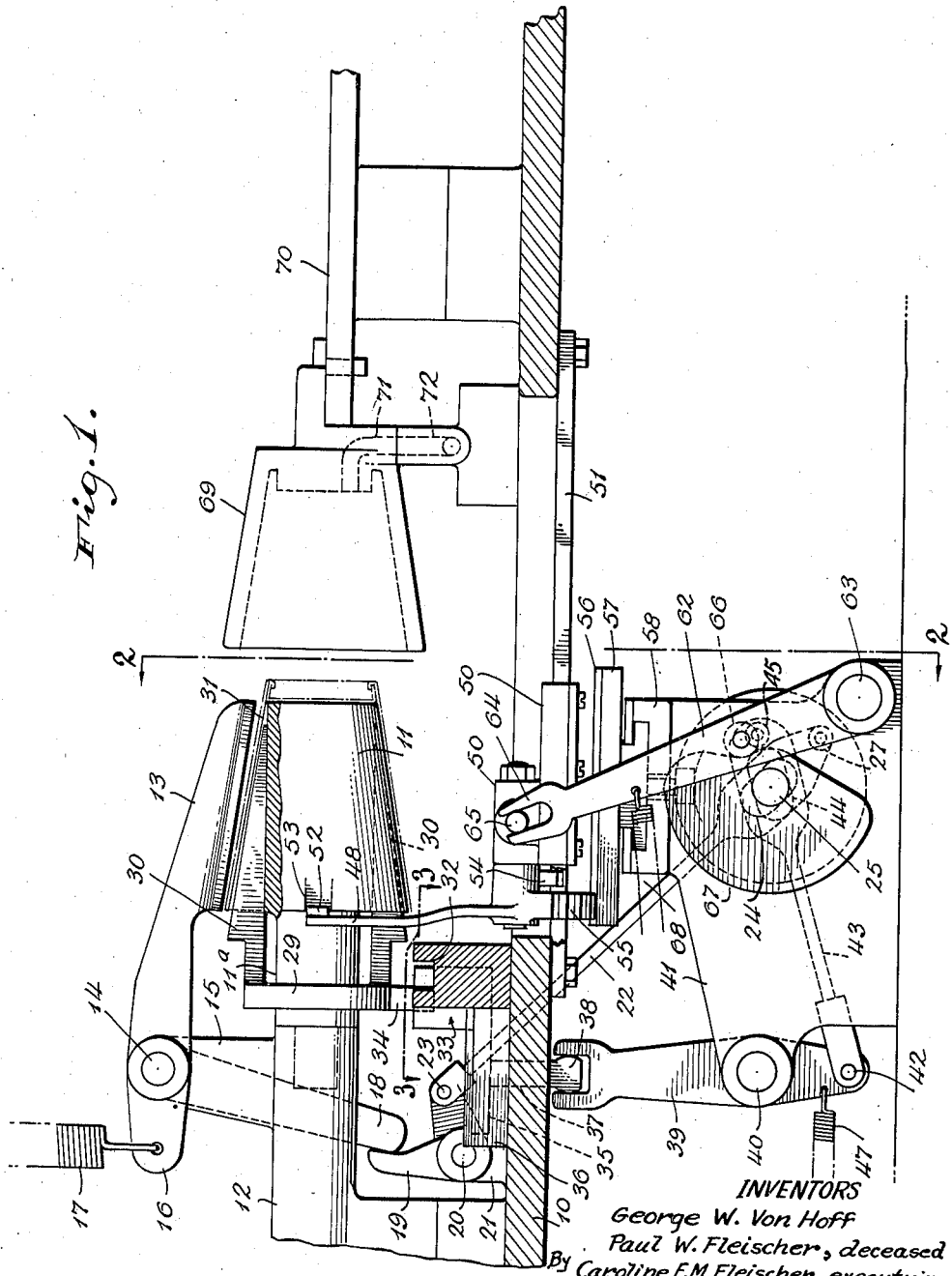

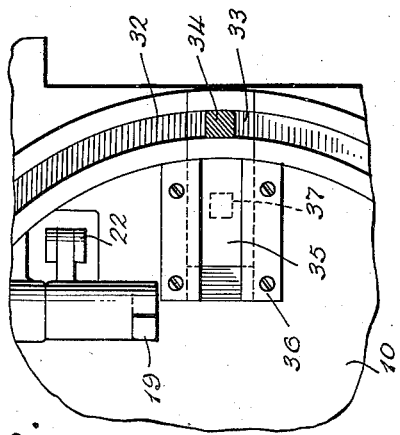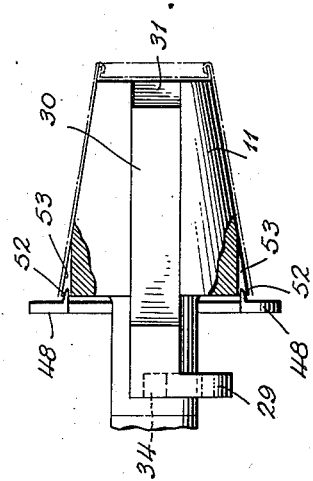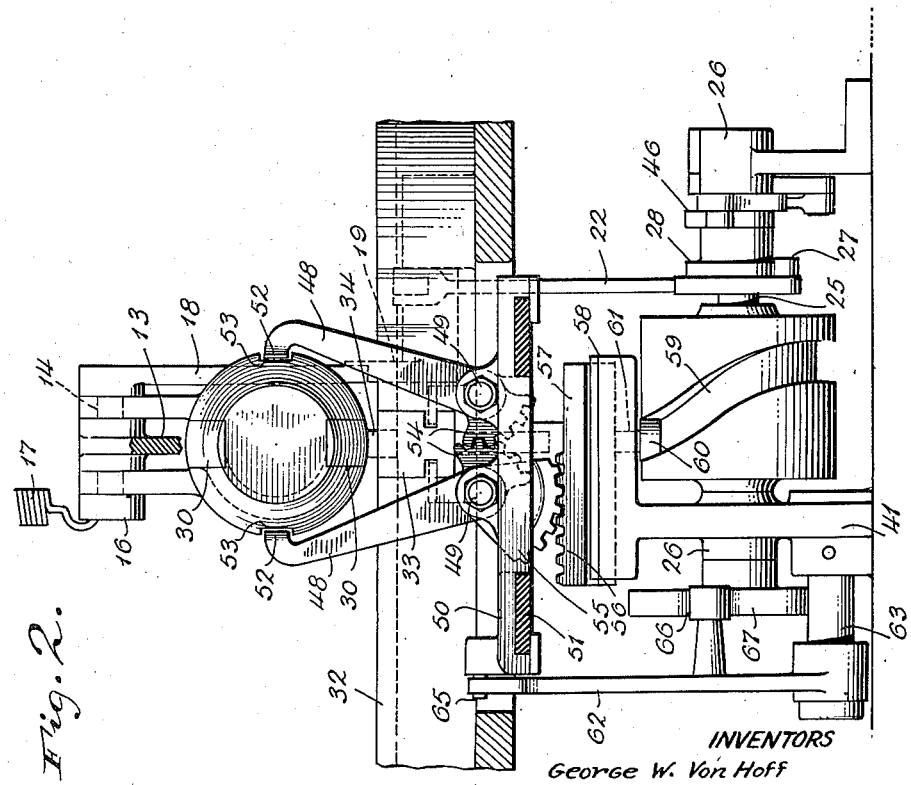

2,095,775

UNITED STATES PATENT OFFICE 2,095,775

CUP MAKING MACHINE

George W. von Hofe, Bound Brook, N. J., and Paul W. Fleischer, deceased, late of Weehawken, N. J., by Caroline E. M. Fleischer, executrix, Weehawken, N. J., assignors to New Jersey Machine Corporation, Hoboken, N. J., a corporation of New Jersey Application April 29, 1936, Serial No. 76,942

17 Claims. (Cl. 93—39.1)

The invention relates to machines for making cups and equivalent receptacles and more particularly to that type of such machines whereby cups or equivalent receptacles consisting of bodies formed by circumferentially applying body blanks to suitable mandrels and adhesively fixing said body blank in body form thereon, and bottoms adhesively combined with the bodies on said mandrels. In machines of the indicated class the cups or equivalent receptacles, after having been formed on the mandrels, are transferred or ejected therefrom in the operation of the machine for further operative steps or for other predetermined disposition, such transfer or ejection from the mandrels generally taking place before the adhesive whereby the body blanks are fixed in body form and the bottoms are adhesively combined therewith has had time to fully set.

The invention contemplates primarily the provision of simple means whereby the formed cups or equivalent receptacles will be ejected or stripped from the forming mandrels in an efficient and uniform manner.

The invention further has for its object to provide stripping means whereby the formed cups or equivalent receptacles will in no way be injured as a result of the ejecting or transfer operation, and whereby the latter operations will be performed without injury to the formed cups and without disturbance of the bottoms thereof.

In addition the invention has for its object to construct and operate the stripping or ejecting means in such manner that the stripping or ejecting of the formed cups or equivalent receptacles is effected without disrupting the adherence of the partly set adhesive and without developing any severe strains on the newly formed cups or equivalent receptacles tending to injure or destroy the same.

Other objects will appear from the description hereinafter and the features of novelty will be pointed out in the claims.

In the accompanying drawings, which illustrate an example of the invention without defining its limits, Fig. 1 is a fragmentary sectional elevation of a cup making machine with the novel features embodied therein; Fig. 2 is a cross-section thereof on the line 2—2 of Fig. 1; Fig. 3 is a fragmentary horizontal section on the line 3—3 of Fig. 1, and Fig. 4 is a fragmentary plan view of a mandrel and associated elements.

For convenience and in order to avoid undue prolixity, the novel features are described hereinafter in connection with cup making machines, it being understood that this term is intended to include machines for making receptacles or containers which are the equivalent of cups of the type in question and further that the expression "cups" as used hereinafter and in the claims is used in a broad sense and is intended to cover such equivalent receptacles or containers.

Cup machines of the kind to which the novel features are specially adapted generally include a suitable support 10 and a plurality of mandrels 11 which usually are of tapering form and are arranged to be bodily movable over a predetermined path in intermittent stages during which the formation of the cups on said mandrels 11 takes place; the cups are customarily constructed of paper or other suitable material and consist of bodies formed by circumferentially applying suitable body blanks to said mandrel through the medium of suitable mechanism and bottoms which are combined with said bodies also by means of suitable mechanism in any well known way. In order to simplify the illustration and description as much as possible, an example of the aforesaid machine has been illustrated in a fragmentary manner, it being understood that this is only illustrative of the machines under discussion and not in any sense intended to limit the construction and arrangement thereof. In the accompanying drawings, a single mandrel 11 of tapering form is accordingly supported upon a table 12 movably mounted upon the support 10 and intermittently rotatable thereon in a horizontal plane in any conventional way. The body blanks which comprise the bodies of the cups when circumferentially applied to the mandrel 11 overlap along their opposed longitudinal edges and having previously been gummed at said edges, are adhesively fixed upon the mandrel as is well known. In order to bring about an efficient adherence of the overlapping portions of the body blanks in the form of the cup bodies, the instant improvements include seam clamping means for clamping said seam or in other words, for developing a pressure thereon to cause the overlapping ends of the body blanks to firmly adhere to each other. As shown in the drawings, this seam clamping means comprises a movable seam clamp 13 extending axially of the mandrel 11 in registry therewith, as shown in Fig. 1. The seam clamp 13 is carried by a shaft 14 pivotally mounted in a bracket 15 and including an extension 16 to which one end of a spring 17 is secured; the other end of the spring 17 is fastened to a suitable part of the machine in any convenient manner. The seam clamping means further includes an arm 18 fastened upon the shaft 14 and depending therefrom and when the formed cups are ready to be stripped from the mandrel 11 projects into operative relation with a bell-crank lever 19 carried by a shaft 20 journalled in a bracket 21 located upon the support 10. Any suitable means may be provided for operating the seam clamp 13 in operative sequence with the other parts of the mechanism to permit the stripping of the formed cups from the mandrel 11, the illustrated example showing this means in the form of a rod 22 pivoted at 23 to the bell-crank lever 19 and provided with a slot 24 through which the cam shaft 25 projects, as shown in Fig. 1; the cam shaft 25 is journalled in suitable stationary bearings 26. A roller 27 is journalled at the lower end of the rod 22 in rolling engagement with a suitably shaped cam 28 carried by the cam shaft 25 and whereby the bell-crank lever 19 is periodically operated to swing the arm 18 in a direction to shift the seam clamp 13 to an inoperative position. It will be understood that each mandrel 11 of the particular machine is provided with its own seam clamp 13 and that the brackets 15 on which each seam clamp is mounted are carried by the table 12 and move therewith. It will further be understood that suitable provision is made in the machine to operate the seam clamps 13 at the proper station in such a manner as to permit the body blanks to be circumferentially applied to the mandrels 11. With this arrangement when a body blank has been circumferentially applied to a mandrel 11 its co-operating seam clamp 13 under the influence of the associated spring 17 will be brought into clamping engagement with the cup body along the seam thereof, this engagement being maintained until the particular mandrel 11 reaches the station on which the formed cup is ejected or stripped from the given mandrel 11. At this stage the arm 18 will be in operative relation to the bell-crank lever 19 which at the proper time, will operate to adjust the seam clamp 13 to the inoperative position illustrated in Fig. 1 to permit the aforesaid ejection or stripping of the formed cup from said mandrel 11.

As the production of the cups upon the machine progresses, the formed cups will develop a restraining engagement with the mandrels 11 which tends to resist the ejection or stripping of the formed cups from said mandrel 11 when the stage of production illustrated in Fig. 1 is reached; this restraining engagement may be due to the tension of the cup body upon the mandrel 11, or in other words, the frictional engagement of the cup body with said mandrel 11, or because of the fact that some of the adhesive along the body seam may have been squeezed by the action of the seam clamp 13 to the surface of the mandrel 11 to thereby cause the cup body to adhere thereto. It will be understood when the ejecting or stripping stage has been reached that the adhesive along the body seam has not fully set so that a maximum adhesion between the overlapping edges of the cup body has not yet been developed; this is also true of the adhesive whereby the bottoms of the cup are adhered to the cup bodies when the cups consist of two parts, that is the cup body and the bottom thereof. In addition, the material of which the cups are made, that is paper or the like, is more or less easily torn or otherwise injured so that unless provision is made to guard against the same, the cups are often injured in the process of ejecting or stripping the same from the mandrels. To prevent this, the instant improvements include means for freeing the cups from the mandrels prior to the ejection or stripping thereof from said mandrels, that is to say, means for relieving the previously mentioned restraining engagement of the cup bodies with said mandrels; because of the fact that this ejecting or stripping means operates on the formed cups before the adhesive in said cups has fully set, the means in question is constructed and arranged to develop an ejecting or stripping force which is ineffective to disrupt the adherence of said partly set adhesive and also so as to avoid any disturbance of the bottoms of said cups during the ejection or stripping thereof from the mandrels 11.

In the illustrated example, the means for relieving the restraining engagement of the cup bodies with the mandrel 11, regardless of the reason for such restraining engagement consists of a movable support 29 which carries at least one member or section 30 and preferably two members or sections 30 arranged in their normal positions to form parts of the mandrel 11 at diametrically opposite points thereof to complete the circumferential surface thereof. In the illustrated example the sections 30 are of tapering form to correspond with the external shape of the mandrel 11 and are slidably movable in recesses 31 of the mandrel 11, said recesses 31 extending longitudinally of said mandrel 11, as shown in Fig. 1; as shown in the drawings, the support 29 is slidably mounted upon the hub 11ᵃ of the mandrel so as to be capable of adjustment in the direction of the axis of said mandrel to correspondingly move the sections 30 lengthwise thereof to and from operative positions relatively thereto and vice versa. The means whereby the support 29 and the sections 30 are operatively actuated may be of any suitable type and may consist of a guiding means corresponding to the path of movement of the mandrel 11 and including a movable element which normally comprises part of said guiding means and is controlled by suitable operating means for periodically shifting said movable element relatively to said guiding means to correspondingly shift the support 29 and sections 30 in the manner to be more fully set forth hereinafter.

In the illustrated example the guiding means comprises a circular guideway 32 concentric to the circular path of movement of the mandrel 11 and including a movable guide sector 33 which normally forms part of the guideway 32 to complete the same as shown in Fig. 3. For proper co-operation with the guideway 32 and guide sector 33 the support 29 is provided with a depending lug 34 which projects into the guideway 32 and at the time the mandrel 11 has reached the ejecting or stripping stage shown in Fig. 1, extends into the guide sector 33. For the purpose of operating the guide sector 33 in the intended manner the latter is carried by a slide 35 slidably mounted in a base 36 fixed upon the support 10 as illustrated in Fig. 1. The slide 35 carries a depending member 37 which projects downwardly through the base 36 and support 10 which are slotted for the accommodation of said member 37, the latter preferably terminating in a spherical end 38 located in the forked end of a lever 39; the latter comprises part of the means whereby the guide sector 33 is operated, said means being of any suitable character adapted for the purpose. In the form shown in the drawings, the lever 39 is pivoted at 40 upon a stationary supporting bracket 41 and is pivotally connected at 42 with one end of an operating rod 43. The latter is slotted at 44 for movement upon the cam shaft 25 and carries a roller 45 in rolling engagement with a cam 46 mounted upon the cam shaft 25 and shaped to bring about the desired operative movements of the lever 39. Preferably a spring 47 has its one end attached to the lever 39 and its other end suitably fastened in the machine for the purpose of maintaining the roller 45 in rolling contact with its co-operating cam 46.

In order to free the formed cup from the mandrel without disturbing the bottom thereof and for the purpose of developing an ejecting force ineffective to disrupt the adherence of the partly set adhesive of said cup and to otherwise prevent injury to the formed cups during the ejection or stripping step, the stripping means consists of a pair of stripping members or levers 48 pivoted at 49 upon a carriage 50 slidably mounted upon a stationary guideway 51 for movement in the direction of the axis of the mandrel 11; the stripping members or levers 48 are provided with stripping devices 52 adapted to extend into open ended recesses 53 with which the mandrel 11 is provided in its circumferential surface, said devices 52 in their operative position thus projecting beneath the formed cup body to enable the stripping members 48 to engage the rim of the cup at its open end. The stripping members or levers 48 are geared together by segments 54 so as to operatively move in unison to and from operative positions and vice versa, the operations of said members or levers 48 being controlled by means of a segment 55 operatively connected with said members or levers 48 and meshing with the geared teeth 56 of a toothed slide 57 slidably mounted in a stationary bracket 58 as shown in Figs. 1 and 2; the teeth 56 extend throughout the length of the slide 57 to permit the desired ejecting or stripping operation of the members or levers 48 as will be more fully pointed out hereinafter.

Any suitable means may be provided for effecting the operation of the slide 57 in a manner to adjust the members or levers 48 to and from their operative positions and vice versa; in the illustrated example this means consists of a grooved cam 59 co-operating with a roller 60 journalled on a stud 61 depending from the slide 57, it being understood that the bracket 58 is slotted to permit the operative movements of the stud 61 relatively thereto. As shown in Fig. 2, the grooved cam 59 is fixed upon the previously mentioned cam shaft 25. Similarly the means for slidably operating the carriage 50 in a manner to cause the members or levers 48 to bring about the ejecting or stripping of the formed cup from the mandrel 11 may be of any type suitable for the purpose. In the illustrated example, this last-named means comprises a lever 62 pivoted at 63 upon the bracket 41 and having its forked free end 64 in operative engagement with a pin or similar projection 65 fixed upon the carriage 50 as shown in Figs. 1 and 2. The lever 62 carries a roller 66 in rolling engagement with a cam 67 fixed upon the cam shaft 25 and maintained in contact therewith in any suitable way as by means of a spring 68. It will be understood that the cam shaft 25 may be rotatively driven in any convenient manner.

While the formed cups after having been ejected or stripped from the mandrels 11 may be disposed of in any desired way, the illustrated form of the machine shows a receptacle 69 having an interior shape complementary to the external shape of the mandrel 11 and accordingly corresponding to the shape of the cups formed thereon. The arrangement is such that when the ejecting or stripping stage has been reached in the production of the cups on the instant machine, the mandrel 11 and the receptacle 69 will be in axial registry with each other; that is to say, the mandrel 11 and the receptacle 69 are arranged to periodically register axially with each other. After the formed cup has been transferred from a mandrel 11 to the receptacle 69, the latter may be used for carrying the formed cup away through additional operative steps to which the cup may be subjected. The receptacle 69 accordingly may be mounted upon a carrier 70 suitably operated to bodily shift the receptacle 69 in a manner to carry out the aforesaid additional operative steps; in addition, the receptacle 69 may include a suction channel 71 arranged for periodic connection with a suction conduit 72 to develop suction in said receptacle 69 whereby the formed cup is drawn into the same and the stripping thereof from the mandrel 11 assisted.

It will be noted that one of the sections 30 when occupying its normal position as part of the mandrel 11 is located in registry with the seam clamping member 13 associated with said mandrel 11 so that the effect of the clamping member 13 to clamp the seam of the cup will be effected against the indicated section 30.

As previously stated, the circumferential application of body blanks to the mandrels 11 and the combination of the cup bottoms with said cup bodies may be effected in any conventional manner, it being understood that the mandrel 11 with a formed cup thereon will finally reach the ejecting or stripping stage illustrated in Fig. 1. Prior to this, the members or levers 48 have been adjusted to an inoperative position so as not to interfere with the mandrel 11 and the formed cup thereon to this point in the machine. At this stage at the proper time the cam 28 by acting on the roller 27 and rod 22 will rock the bellcrank lever 19 in a direction to move the arm 18 in a manner to adjust the seam clamp 13 to the inoperative position shown in Fig. 1. In proper sequence with these operations the cam 46 acting on the roller 45 and rod 43 will pivotally rock the lever 39 in a manner to shift the movable guide sector 33 relatively to the guideway 32 to the position shown in Fig. 1 and to correspondingly adjust the support 29 along the hub 11ᵃ toward the left in Fig. 1; this will correspondingly move the members or sections 30 in the same direction relatively to the mandrel 11 to the inoperative position illustrated in Fig. 1 in which the restraining engagement of the cup body with the mandrel 11 is relieved. At the proper time the grooved cam 59 in co-operation with the roller 60 and stud 61 will shift the slide 57 relatively to the bracket 58 in a direction to swing the stripping members or levers 48 to the operative position illustrated in Fig. 1, after which the cam 67 acting on the roller 66 and lever 62 will adjust the carriage 50 to cause the segment 55 to move lengthwise of the teeth 56 of the slide 57 toward the right in Fig. 1; these operations will correspondingly shift the stripping members or levers 48 in the direction of the axis of the mandrel 11 to cause the stripping devices 52 to enter the recesses 53 beneath the formed cup on the mandrel 11 and to bring the members or levers 48 into contact with the rim of said formed cup at the open end thereof. As the operation of the last mentioned mechanism continues to shift the members or levers 48 to the right in Fig. 1 an ejecting or stripping force will be exerted upon the cup whereby the latter will be forced from the mandrel 11 and in the illustrated form of the machine transferred to the receptacle 69. It will be noted that the ejecting or stripping of the cup from the mandrel 11 takes place subsequently to the operation of the members or sections 30 whereby the restraining engagement of the cup with the mandrel 11 is relieved or in other words, subsequently to the relief of said restraining engagement.

With this arrangement, if any adhesive should have been squeezed from the longitudinal seam of the cup body by the action of the seam clamp 13, such adhesive will have been applied to the member or section 30 located beneath said seam clamp 13; as a result when said member or section 30 is adjusted to an inoperative position relatively to the mandrel 11 as described hereinbefore, any adhesion of the cup body resulting from the adhesive will be easily overcome without injury to the cup. At the same time the adjustment of the members or sections 30 to their inoperative positions relatively to the mandrel 11 will overcome any tension or friction tending to establish a restraining engagement of the cup body with the mandrel whereby its removal from said mandrel might be resisted. As a result of this and further because of the fact that the ejecting or stripping force is developed against the rim of the cup the latter is forced from said mandrel with a minimum of effort and without any injurious effect upon the formed cup and without disturbing the bottom thereof.

The novel arrangements and mechanisms illustrated and described herein are simple in construction and of maximum efficiency in operation and require no skilled supervision. The novel features are also capable of being incorporated in existing cup making machines of the type for which they are adapted.

Various changes in the specific forms shown and described may be made within the scope of the claims without departing from the spirit of the invention.

We claim as the invention of the said George W. von Hofe and the said Paul W. Fleischer, deceased:

1. In a machine for making cups consisting of a body and a bottom combined therewith, the combination of a mandrel on which the bodies of said cups are formed by circumferentially applying body blanks thereto, a movable seam clamp for clamping the seams of said bodies, and a movable section normally forming a part of said mandrel and against which said seam clamp operates, said movable section being adjustable relatively to said mandrel to an inoperative position to relieve the restraining engagement of said cup bodies with said mandrel to permit removal of the formed cups therefrom.

2. In a machine for making cups, the combination of a mandrel externally tapered in the direction of its axis on which the bodies of said cups are formed by circumferentially applying the body blanks thereto, said bodies when formed on said mandrel having longitudinal seams, a movable seam clamp adapted to clamp said seams, a plurality of sections of tapering form to correspond with the external taper of the mandrel and normally forming part of said mandrel, and means for adjusting said tapering sections relatively to said mandrel in the direction of its axis to relieve the restraining engagement of said cup bodies with said mandrel.

3. In a machine for making cups, the combination of a tapered mandrel on which the bodies of said cups are formed by circumferentially applying the body blanks thereto, said bodies when formed on said mandrel having longitudinal seams, a longitudinally movable section normally forming part of said mandrel in registry with said seams, a movable seam clamp operating against said movable section to clamp said seams, and means for longitudinally adjusting said movable section relatively to said mandrel to relieve the restraining engagement of said cup bodies with said mandrel.

4. In a machine for making paper cups, the combination of a mandrel externally tapered in the direction of its axis on which the bodies of said cups are formed, a movable section of tapering form corresponding to the external taper of the mandrel and normally forming a part of said mandrel to complete the forming surface thereof, and means for adjusting said section relatively to said mandrel in the direction of its axis to break the continuity of said forming surface and to thereby relieve the restraining engagement of said cup bodies with said mandrel.

5. In a machine for making paper cups, the combination of a mandrel on which the bodies of said cups are formed, a movable section having an outer surface normally forming a part of said mandrel and cooperating with the outer surface thereof to complete the forming surface of said mandrel, means for adjusting said section relatively to said mandrel in the direction of its axis to break the continuity of said forming surface and to thereby relieve the restraining engagement of said cup bodies with said mandrel, and means for subsequently removing said cups from said mandrel in an axial direction.

6. In a machine for making paper cups, the combination of a mandrel on which the bodies of said cups are formed, a movable section having an outer surface normally forming a part of said mandrel and cooperating with the outer surface thereof to complete the forming surface of said mandrel, means for adjusting said section relatively to said mandrel in the direction of its axis to break the continuity of said forming surface and to thereby relieve the restraining engagement of said cup bodies with said mandrel, and means engaging the periphery of said cups at the open ends thereof for removing said cups from said mandrel in an axial direction.

7. In a machine for making cups consisting of a body adhesively fixed in its finished form and a bottom adhesively combined with said body, the combination of a mandrel having an outer surface of permanent form interrupted in peripheral continuity on which the cup bodies are formed by circumferentially applying body blanks thereto and adhesively fixing said blanks in body form thereon, and on which cup bottoms are adhesively combined with said bodies, means for ejecting the cups from said mandrel before the adhesive has fully set, the ejecting force developed by said means being ineffective to disrupt the adherence of said partly set adhesive, and means extending into the peripheral interruption of said outer surface and normally lying substantially flush therewith to complete said outer surface of the mandrel, said last-named means being movable relatively to said mandrel surface to break the peripheral continuity thereof whereby unintentional adherence of said cups to said mandrel tending to resist said ejection is relieved prior to the removal of the cups from the mandrel.

8. In a machine for making cups consisting of a body and a bottom combined therewith, the combination of a mandrel on which the bodies of said cups are formed by circumferentially applying body blanks thereto, a movable support, a plurality of members carried by said support and normally lying substantially flush with the outer surface of said mandrel to complete said outer surface, means acting on said support to periodically adjust said members relatively to said mandrel to an inoperative position out of flush relation with said mandrel surface and independently thereof for relieving the restraining engagement of said cup bodies with said mandrel, and means engaging the rims of said cups and arranged to strip the latter from said mandrel subsequently to the relief of said restraining engagement.

9. In a machine for making cups consisting of a body and a bottom combined therewith, the combination of a mandrel on which the bodies of said cups are formed by circumferentially applying body blanks thereto, a movable support, a plurality of members carried by said support and normally forming part of said mandrel, a movable seam clamp operating in registry with one of said members for clamping the seams of said bodies, actuating means for operating said seam clamp, means acting on said support in operating synchronism with said actuating means to periodically adjust said members relatively to said mandrel to an inoperative position for relieving the restraining engagement of said cup bodies with said mandrel, and means engaging the rims of said cups and arranged to strip the latter from said mandrel subsequently to the relief of said restraining engagement.

10. In a machine for making cups consisting of a tapering body and a bottom combined therewith, the combination of a tapered mandrel on which the bodies of said cups are formed by circumferentially applying body blanks thereto, a movable support, a plurality of tapered members carried by said support and normally forming part of said mandrel, a movable seam clamp operating in registry with one of said members for clamping the seams of said bodies, actuating means for operating said seam clamp, means acting on said support in operating synchronism with said actuating means to periodically adjust said members relatively to said mandrel to an inoperative position for relieving the restraining engagement of said cup bodies with said mandrel, means engaging the rims of said cups and arranged to strip the latter from said mandrel subsequently to the relief of said restraining engagement, and a receptacle having an interior shape complemental to that of the mandrel arranged to periodically register axially with said mandrel for receiving the cups stripped therefrom.

11. In a machine for making cups consisting of a body and a bottom combined therewith, the combination of a mandrel on which the bodies of said cups are formed by circumferentially applying body blanks thereto, said mandrel being bodily movable over a predetermined path, guiding means corresponding to the path of movement of said mandrel, a movable element comprising part of said guiding means, a movable support guided by said guiding means in fixed relation to said mandrel, a member carried by said support and normally forming part of said mandrel, means for periodically shifting said movable element relatively to said guiding means to correspondingly shift said support and adjust said member relatively to said mandrel to an inoperative position for relieving the restraining engagement of said cup bodies with said mandrel, and means for stripping the cups from said mandrel subsequently to the relief of said restraining engagement.

12. In a machine for making cups consisting of a body and a bottom combined therewith, the combination of a mandrel on which the bodies of said cups are formed by circumferentially applying body blanks thereto, said mandrel being bodily movable over a circular path, a circular guideway concentric to the circular path of movement of said mandrel, a movable guide sector forming part of said guideway, a movable support projecting into said guideway and guided thereby in fixed relation to said mandrel, a pair of members carried by said support and normally forming part of said mandrel at diametrically opposite points thereof, means for periodically shifting said segment relatively to said guideway to correspondingly shift said support and adjust said members relatively to said mandrel to an inoperative position for relieving the restraining engagement of said cup bodies with said mandrel, and means for stripping the cups from said mandrel subsequently to the relief of said restraining engagement.

13. In a machine for making cups consisting of a body and a bottom combined therewith, the combination of a mandrel on which the bodies of said cups are formed by circumferentially applying body blanks thereto, said mandrel being provided with recesses in its circumferential face, means lying substantially flush with the outer surface of said mandrel and adjusted periodically to an inoperative position out of flush relation to said mandrel surface and independently thereof to relieve the restraining engagement of said cup bodies with said mandrel, stripping means adapted to enter said recesses and engage the rims of said cups, and means for shifting said stripping means in the direction of the axis of said mandrel to strip the cups therefrom subsequently to the relief of said restraining engagement.

14. In a machine for making cups consisting of a body and a bottom combined therewith, the combination of a mandrel on which the bodies of said cups are formed by circumferentially applying body blanks thereto, said mandrel being provided with recesses in its circumferential face, means operated periodically to relieve the restraining engagement of said cup bodies with said mandrel, pivoted stripping levers geared together for movement to and from operative positions, stripping devices carried by said levers and adapted to enter recesses beneath the cup bodies thereon, and means for shifting said stripping levers and stripping devices in the direction of the axis of said mandrel to strip the cups therefrom subsequently to the relief of said restraining engagement.

15. In a machine for making cups consisting of a body and a bottom combined therewith, the combination of a mandrel on which the bodies of said cups are formed by circumferentially applying body blanks thereto, means operated periodically to relieve the restraining engagement of said cup bodies with said mandrel, pivoted stripping members geared together for movement to and from operative positions, a toothed segment operatively combined with said stripping members, a toothed slide meshing with said segment, a stationary bracket on which said slide is slidably mounted, means for moving said slide relatively to said bracket for shifting said stripping members to and from operative positions, and means for adjusting said segment relatively to said slide to thereby shift said stripping members in the direction of the axis of said mandrel to strip the cups therefrom subsequently to the relief of said restraining engagement.

16. In a machine for making cups consisting of a body and a bottom combined therewith, the combination of a mandrel on which the bodies of said cups are formed by circumferentially applying body blanks thereto, means operated periodically to relieve the restraining engagement of said cup bodies with said mandrel, pivoted stripping members geared together for movement to and from operative positions, a toothed segment operatively combined with said stripping members, a toothed slide meshing with said segment, a stationary bracket on which said slide is slidably mounted, means for moving said slide relatively to said bracket for shifting said stripping members to and from operative positions, means for adjusting said segment relatively to said slide to thereby shift said stripping members in the direction of the axis of said mandrel to strip the cups therefrom subsequently to the relief of said restraining engagement, and a receptacle arranged to periodically register axially with said mandrel and to receive the cups stripped from said mandrel.

17. In a machine for making cups, the combination of a mandrel on which the bodies of said cups are formed by circumferentially applying the body blanks thereto, a movable section having an outer surface normally lying substantially flush with the outer surface of said mandrel to complete and constitute part of said outer surface, and means for periodically adjusting said section to shift its outer surface axially and inwardly relatively to said mandrel surface to break the peripheral continuity thereof and thereby relieve the restraining engagement of said cup bodies with said mandrel.

GEORGE W. von HOFE.
CAROLINE E. M. FLEISCHER,
*Executrix of the Estate of Paul W. Fleischer, Deceased.*